(12) United States Patent
Amato

(10) Patent No.: US 10,615,837 B1
(45) Date of Patent: Apr. 7, 2020

(54) CELLULAR TELEPHONE CASE

(71) Applicant: Giuseppe Amato, Mcalisterville, PA (US)

(72) Inventor: Giuseppe Amato, Mcalisterville, PA (US)

(*) Notice: Subject to any disclaimer, the term of this patent is extended or adjusted under 35 U.S.C. 154(b) by 0 days.

(21) Appl. No.: 16/385,073

(22) Filed: Apr. 16, 2019

(51) Int. Cl.
| H04M 1/00 | (2006.01) |
| H04B 1/3888 | (2015.01) |
| H04M 1/02 | (2006.01) |
| A45C 11/00 | (2006.01) |

(52) U.S. Cl.
CPC ........... H04B 1/3888 (2013.01); A45C 11/00 (2013.01); H04M 1/0202 (2013.01); A45C 2011/002 (2013.01); H04M 1/00 (2013.01); H04M 1/0214 (2013.01)

(58) Field of Classification Search
CPC ... H04W 1/035; H04W 1/0214; H04W 1/026; H04W 1/0264; H04W 1/03; H04B 1/3877; H04B 1/3833; H04B 1/034; H04B 1/3827; H04M 1/00; H04M 1/0214; H04M 1/0216; H04M 1/0222; H04M 1/0225; H04M 1/0235
See application file for complete search history.

(56) References Cited

U.S. PATENT DOCUMENTS

| 5,517,683 | A | * | 5/1996 | Collett | ................. | H04B 1/3827 |
| | | | | | | 379/450 |
| 7,437,179 | B1 | * | 10/2008 | Sharp | ................. | H04M 1/0214 |
| | | | | | | 455/550.1 |
| 8,700,107 | B1 | | 4/2014 | Oh | | |
| 9,264,526 | B1 | | 2/2016 | Burns | | |
| 9,318,089 | B2 | | 4/2016 | Burnett | | |
| 9,861,005 | B2 | | 1/2018 | Li | | |
| 9,961,175 | B2 | | 5/2018 | Fields | | |
| 2013/0048413 | A1 | | 2/2013 | Patzer | | |
| 2014/0174846 | A1 | | 6/2014 | Molinaro | | |
| 2014/0310643 | A1 | * | 10/2014 | Karmanenko | ........ | G06F 1/1626 |
| | | | | | | 715/784 |
| 2016/0173669 | A1 | * | 6/2016 | Smiley | ................. | H04M 1/0283 |
| | | | | | | 455/575.1 |
| 2017/0149270 | A1 | * | 5/2017 | Adams | ..................... | H02J 7/025 |
| 2018/0064972 | A1 | * | 3/2018 | Cordani | ................... | A62C 3/16 |
| 2018/0103134 | A1 | | 4/2018 | Malallah | | |
| 2018/0270339 | A1 | * | 9/2018 | Pellegrino | ............. | H04M 1/185 |

FOREIGN PATENT DOCUMENTS

EP          2574016        3/2014

* cited by examiner

Primary Examiner — Jean A Gelin

(57) ABSTRACT

The cellular telephone case comprises a sound deflector, a heat conducting sheet, a plurality of vent apertures, one or more bumpers, and an ear rest. The case fits onto a cellular telephone. The sound deflector may increase the audio volume of a cell phone by deflecting sound energy to the front of the phone. The ear rest may increase the comfort when using the cell phone. The heat conducting sheet and the plurality of vent apertures may enhance the cooling of the cell phone by spreading the heat over a larger surface area and by allowing air to carry the heat away. The one or more bumpers may enhance the cooling of the cell phone and increase the audio volume by creating a gap between the rear of the phone case and the surface upon which the phone has been laid.

16 Claims, 4 Drawing Sheets

CELLULAR TELEPHONE CASE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of equipment cases, more specifically, a cellular telephone case.

SUMMARY OF INVENTION

The cellular telephone case comprises a sound deflector, a heat conducting sheet, a plurality of vent apertures, one or more bumpers, and an ear rest. The case fits onto a cellular telephone. The sound deflector may increase the audio volume of a cell phone by deflecting sound energy to the front of the phone. The ear rest may increase the comfort when using the cell phone. The heat conducting sheet and the plurality of vent apertures may enhance the cooling of the cell phone by spreading the heat over a larger surface area and by allowing air to carry the heat away. The one or more bumpers may enhance the cooling of the cell phone and increase the audio volume by creating a gap between the rear of the phone case and the surface upon which the phone has been laid.

An object of the invention is to protect a cellular telephone by providing a protected covering for the phone.

Another object of the invention is to increase the comfort while using the phone.

A further object of the invention is to increase the audio volume of the phone.

Yet another object of the invention is to enhance the cooling of the phone.

These together with additional objects, features and advantages of the cellular telephone case will be readily apparent to those of ordinary skill in the art upon reading the following detailed description of the presently preferred, but nonetheless illustrative, embodiments when taken in conjunction with the accompanying drawings.

In this respect, before explaining the current embodiments of the cellular telephone case in detail, it is to be understood that the cellular telephone case is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cellular telephone case.

It is therefore important that the claims be regarded as including such equivalent construction insofar as they do not depart from the spirit and scope of the cellular telephone case. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
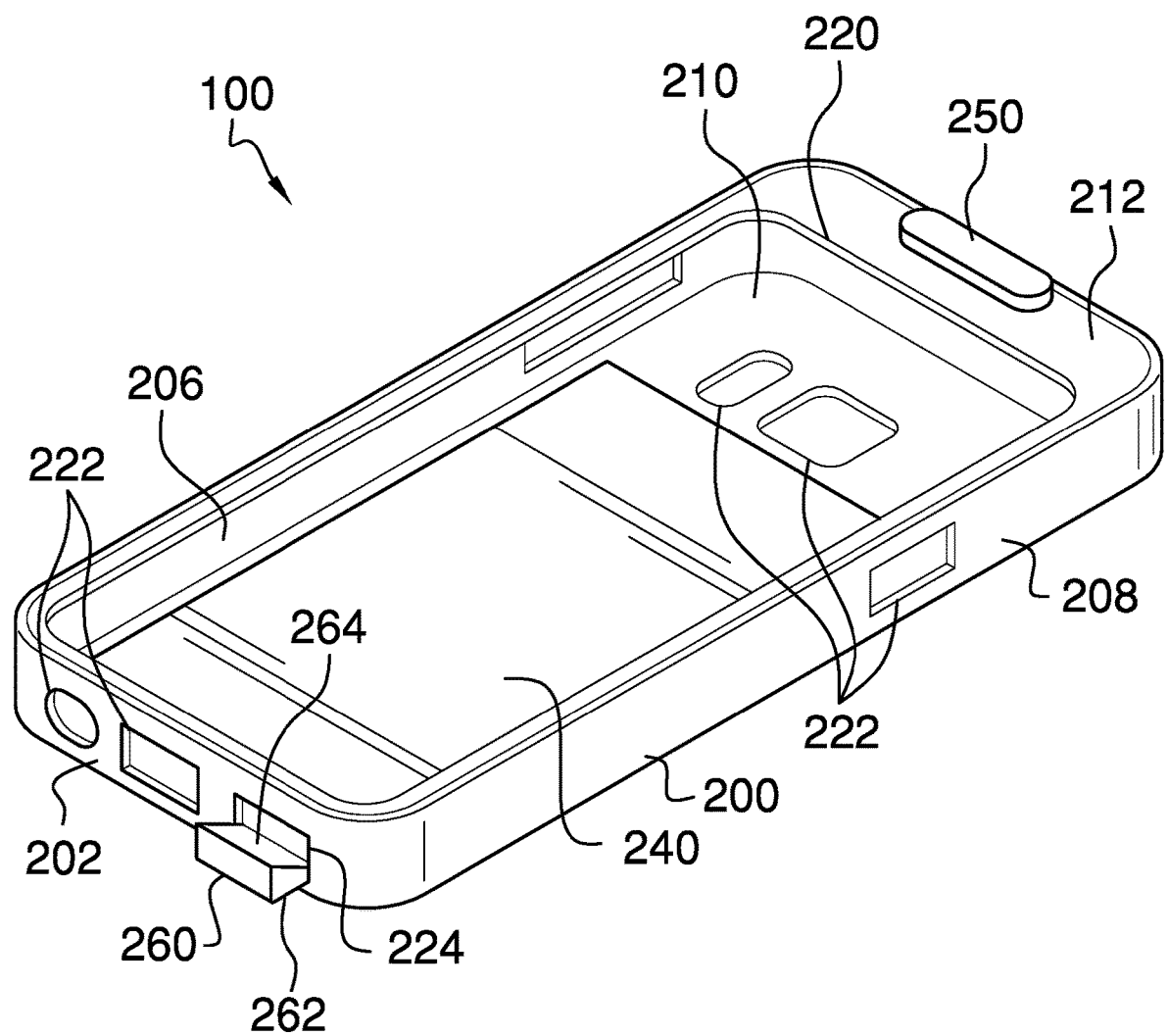
FIG. 1 is a perspective view of an embodiment of the disclosure.
Figure 2:
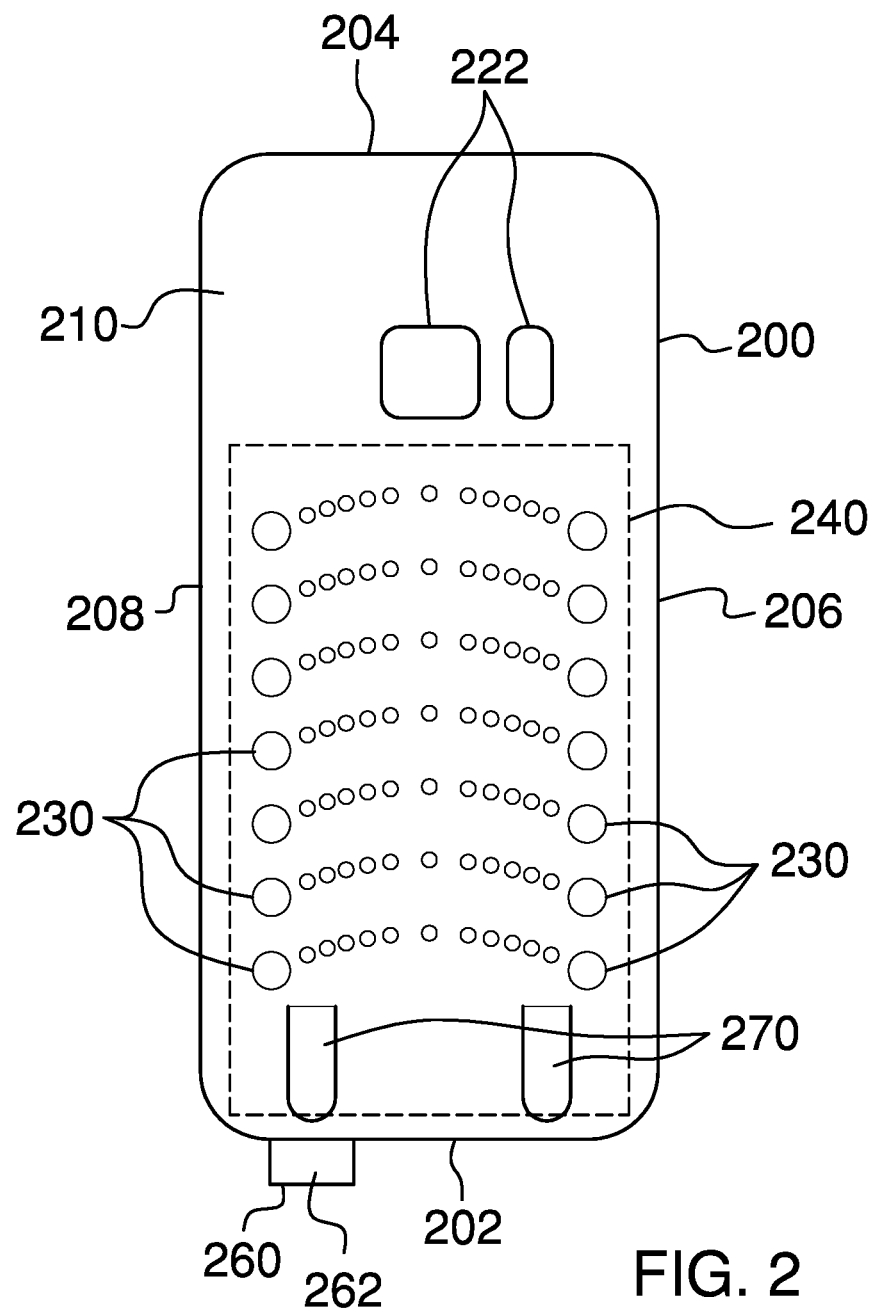
FIG. 2 is a rear view of an embodiment of the disclosure.
Figure 3:
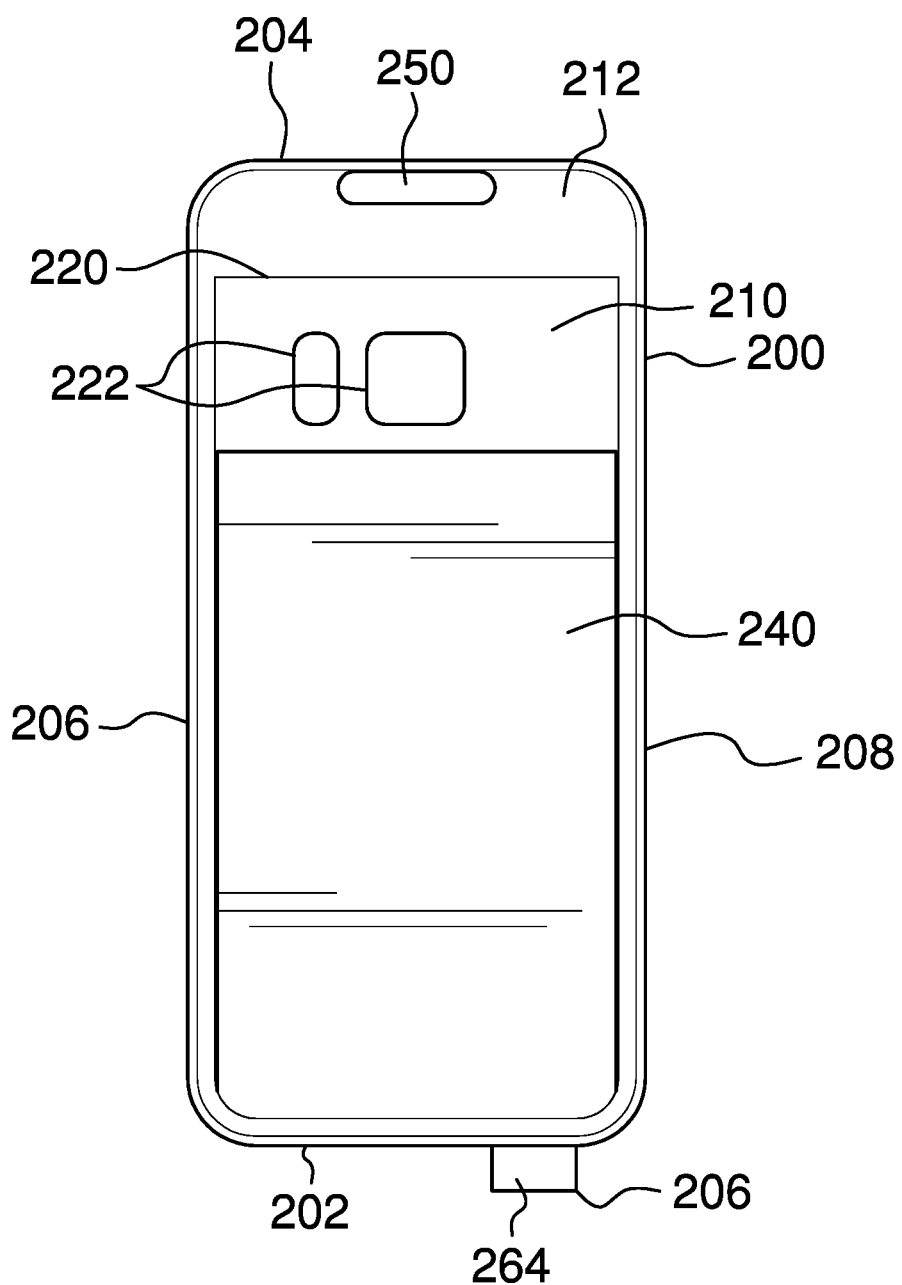
FIG. 3 is a front view of an embodiment of the disclosure.
Figure 4:
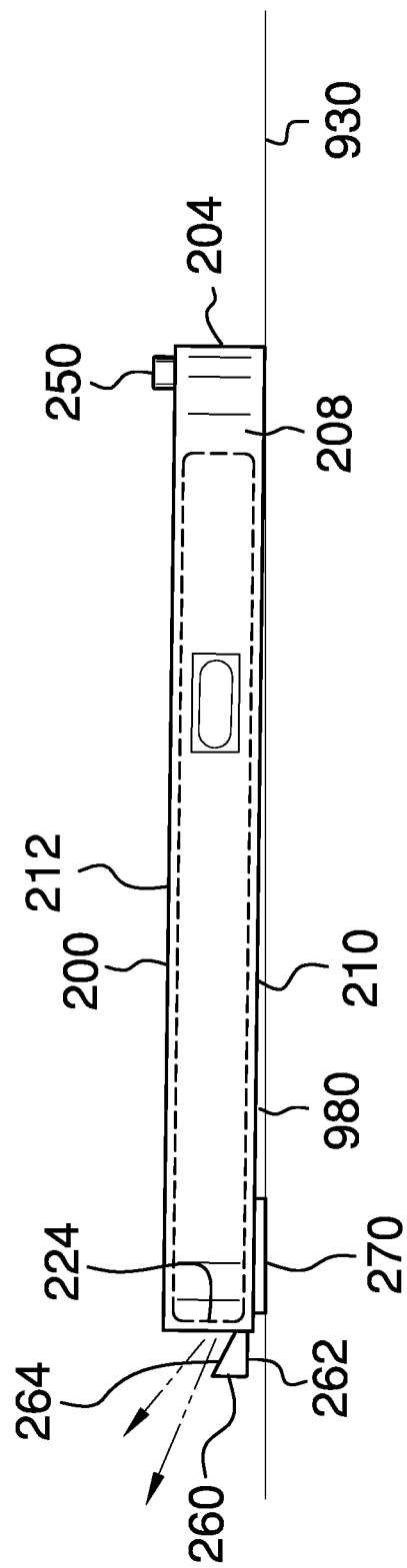
FIG. 4 is a side view of an embodiment of the disclosure.

Detailed reference will now be made to a first potential embodiment of the disclosure, which is illustrated in FIGS. 1 through 4.

The cellular telephone case 100 (hereinafter invention) comprises a case 200, a sound deflector 260, a heat conducting sheet 240, a plurality of vent apertures 230, one or more bumpers 270, and an ear rest 250. The sound deflector 260 may increase the audio volume of a cell phone. The ear rest 250 may increase the comfort when using the cell phone. The heat conducting sheet 240 and the plurality of vent apertures 230 may enhance the cooling of the cell phone. The one or more bumpers 270 may enhance the cooling of the cell phone and increase the audio volume.

The case 200 may enclose the cell phone and may protect the cell phone from damage if the cell phone is dropped. The case 200 may comprise a front wall 212, a rear wall 210, a left side wall 206, a right side wall 208, a top side wall 204, and a bottom side wall 202. The left edge of the front wall 212 may be coupled to the front edge of the left side wall 206. The right edge of the front wall 212 may be coupled to the front edge of the right side wall 208. The top edge of the front wall 212 may be coupled to the front edge of the top side wall 204. The bottom edge of the front wall 212 may be coupled to the front edge of the bottom side wall 202. The left edge of the rear wall 210 may be coupled to the rear edge of the left side wall 206. The right edge of the rear wall 210 may be coupled to the rear edge of the right side wall 208.

The top edge of the rear wall 210 may be coupled to the rear edge of the top side wall 204. The bottom edge of the rear wall 210 may be coupled to the rear edge of the bottom side wall 202. The top edge of the left side wall 206 may be coupled to the left edge of the top side wall 204. The bottom edge of the left side wall 206 may be coupled to the left edge of the bottom side wall 202. The top edge of the right side wall 208 may be coupled to the right edge of the top side wall 204. The bottom edge of the right side wall 208 may be coupled to the right edge of the bottom side wall 202. The front wall 212 of the case 200 may comprise a display aperture 220. The display aperture 220 may provide access to a display of the cell phone. The case 200 may be made from a semirigid material.

The case 200 may comprise a plurality of access apertures 222. The plurality of access apertures 222 may provide access to features of the cell phone through the case 200. The plurality of access apertures 222 may be located on the rear wall 210, the front wall 212, the top side wall 204, the bottom side wall 202, the left side wall 206, or the right side wall 208 of the case 200. As non-limiting examples, the features of the cell phone may comprise a power control, one or more volume controls, a power connector, a camera lens, a camera flash, or an earphone connector. The plurality of access apertures 222 may comprise a bottom sound aperture 224 that provides a clear path for audio to exit the cell phone from a phone bottom sound aperture.

The case 200 may comprise the sound deflector 260. The sound deflector 260 may be a projection from the bottom side wall 202 of the case 200. The sound deflector 260 may increase the audio volume of the cell phone. As a non-limiting example, the sound deflector 260 may increase the audio volume of the cell phone when on speakerphone using the phone bottom sound aperture by deflecting more sound energy towards a user. With the case 200 lying flat on a horizontal surface 930 with the rear wall 210 against the horizontal surface 930, a rear surface of the sound deflector 262 of the sound deflector 260 may extend away from the case 200 parallel to the horizontal surface 930 from a location between the bottom sound aperture 224 and the rear wall 210 of the case 200. A front surface of the sound deflector 264 may extend from the bottom of the bottom sound aperture 224 in a direction that is simultaneously up and away from the case 200. The front surface of the sound deflector 264 may present an obliquely angled surface adjacent the bottom sound aperture 224 such that the audio coming from the phone bottom sound aperture of the cell phone through the bottom sound aperture 224 is deflected towards the front of the cell phone by the sound deflector 260.

The heat conducting sheet 240 may be coupled to the interior side of the rear wall 210 where it may press against the rear surface of the cell phone. The heat conducting sheet 240 may conduct heat away from the cell phone. The heat conducting sheet 240 may spread the heat over the heat conducting sheet 240 and may expel the heat through the plurality of vent apertures 230 located in the rear wall 210 of the case 200. In some embodiments, the heat conducting sheet 240 may extend from the bottom side wall 202 to the camera lens and/or flash apertures without covering those apertures and from the right side wall 208 to the left side wall 206.

The plurality of vent apertures 230 may comprise two or more apertures located on the rear wall 210 of the case 200 in an area that is adjacent to the heat conducting sheet 240. The plurality of vent apertures 230 may allow air to reach the heat conducting sheet 240.

The one or more bumpers 270 may be one or more projections from the rear wall 210 located between the plurality of vent apertures 230 and the bottom side wall 202. The one or more bumpers 270 may be spacers that create a gap 980 between the rear wall 210 of the cell phone and the horizontal surface 930 that the cell phone is resting on. The ear rest 250 may extend perpendicular to the plane of the front wall 212.

The ear rest 250 may be a projection from the front wall 212 located between the display aperture 220 and the top side wall 204. The ear rest 250 may extend perpendicular to the plane of the front wall 212. The ear rest 250 may be made of a padded material and may be adapted to cushion a side of the user's face.

In use, the cell phone may be placed into the case 200 by passing the cell phone through the display aperture 220. Once in the case 200, the cell phone may be used normally and the user may have full access to controls and connectors via the plurality of access apertures 222. During calls, the cell phone may be placed against the side of the user's face and the ear rest 250 may improve the comfort level of the user. The heat conducting sheet 240 may reduce the temperature of the cell phone by conducting heat away from the back of the cell phone and spreading it over a larger area. In addition, air may reach the heat conducting sheet 240 via the plurality of vent apertures 230 on the rear wall 210 of the case 200 and may carry heat away. When the cell phone is placed flat on the horizontal surface 930, the one or more bumpers 270 may create the gap 980 between the rear wall 210 of the case 200 and the horizontal surface 930 which may allow air to circulate around the cell phone, thus assisting in cooling the cell phone. If the phone bottom sound aperture is used as a speakerphone, the sound deflector 260 may increase the audio volume by redirecting the sound energy towards the user. The one or more bumpers 270 may increase the audio volume of the phone bottom sound aperture by allowing sound energy leaving the rear of the case 200 to be deflected towards the front by the horizontal surface 930 instead of being muffled under the cell phone.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used in this disclosure, an "earphone" refers to a device that converts electrical signals into audible sounds that are worn or listened to in contact with the ear.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, the word "interior" is used as a relational term that implies that an object is located or contained within the boundary of a structure or a space.

As used in this disclosure, "resilient" or "semi-rigid" refer to an object or material which will deform when a force is applied to it and which will return to its original shape when the deforming force is removed.

As used in this disclosure, a "vent" is an opening in the structure that allows air to enter or escape.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A cellular telephone case comprising:
    a case, a sound deflector, a heat conducting sheet, a plurality of vent apertures, one or more bumpers, and an ear rest;
    wherein the sound deflector increases the audio volume of a cell phone;
    wherein the ear rest increases the comfort when using the cell phone;
    wherein the heat conducting sheet and the plurality of vent apertures enhance the cooling of the cell phone;
    wherein the one or more bumpers enhance the cooling of the cell phone and increase the audio volume;
    wherein the case comprises a front wall, a rear wall, a left side wall, a right side wall, a top side wall, and a bottom side wall;
    wherein the left edge of the front wall is coupled to the front edge of the left side wall;
    wherein the right edge of the front wall is coupled to the front edge of the right side wall;
    wherein the top edge of the front wall is coupled to the front edge of the top side wall;
    wherein the bottom edge of the front wall is coupled to the front edge of the bottom side wall;
    wherein the left edge of the rear wall is coupled to the rear edge of the left side wall;
    wherein the right edge of the rear wall is coupled to the rear edge of the right side wall;
    wherein the top edge of the rear wall is coupled to the rear edge of the top side wall;
    wherein the bottom edge of the rear wall is coupled to the rear edge of the bottom side wall;
    wherein the top edge of the left side wall is coupled to the left edge of the top side wall;
    wherein the bottom edge of the left side wall is coupled to the left edge of the bottom side wall;
    wherein the top edge of the right side wall is coupled to the right edge of the top side wall;
    wherein the bottom edge of the right side wall is coupled to the right edge of the bottom side wall;
    wherein the plurality of access apertures comprise a bottom sound aperture that provides a clear path for audio to exit the cell phone from a phone bottom sound aperture;
    wherein with the case lying flat on a horizontal surface with the rear wall against the horizontal surface, a rear surface of the sound deflector extends away from the case parallel to the horizontal surface from a location between the bottom sound aperture and the rear wall of the case;
    wherein a front surface of the sound deflector extends from the bottom of the bottom sound aperture in a direction that is simultaneously up and away from the case.

2. The cellular telephone case according to claim 1
    wherein the case encloses the cell phone and protects the cell phone from damage if the cell phone is dropped.

3. The cellular telephone case according to claim 2
    wherein the front wall of the case comprises a display aperture;
    wherein the display aperture provides access to a display of the cell phone.

4. The cellular telephone case according to claim 3
    wherein the case is made from a semirigid material.

5. The cellular telephone case according to claim 3
    wherein the case comprises a plurality of access apertures;
    wherein the plurality of access apertures provide access to features of the cell phone through the case.

6. The cellular telephone case according to claim 5
    wherein the plurality of access apertures are located on the rear wall, the front wall, the top side wall, the bottom side wall, the left side wall, or the right side wall of the case.

7. The cellular telephone case according to claim 6
    wherein the case comprises the sound deflector;
    wherein the sound deflector is a projection from the bottom side wall of the case;
    wherein the sound deflector increases the audio volume of the cell phone.

8. The cellular telephone case according to claim 7
    wherein the front surface of the sound deflector presents an obliquely angled surface adjacent the bottom sound aperture such that the audio coming from the phone bottom sound aperture of the cell phone through the bottom sound aperture is deflected towards the front of the cell phone by the sound deflector.

9. The cellular telephone case according to claim 8
    wherein the heat conducting sheet is coupled to the interior side of the rear wall.

10. The cellular telephone case according to claim 9
wherein the heat conducting sheet conducts heat away from the cell phone;
wherein the heat conducting sheet spreads the heat over the heat conducting sheet and expels the heat through the plurality of vent apertures located in the rear wall of the case.

11. The cellular telephone case according to claim 10
wherein the heat conducting sheet extends from the bottom side wall to the camera lens and/or flash apertures without covering those apertures and from the right side wall to the left side wall.

12. The cellular telephone case according to claim 10
wherein the plurality of vent apertures comprise two or more apertures located on the rear wall of the case in an area that is adjacent to the heat conducting sheet;
wherein the plurality of vent apertures allow air to reach the heat conducting sheet.

13. The cellular telephone case according to claim 12
wherein the one or more bumpers are one or more projections from the rear wall located between the plurality of vent apertures and the bottom side wall;
wherein the one or more bumpers are spacers that create a gap between the rear wall of the cell phone and the horizontal surface that the cell phone is resting on.

14. The cellular telephone case according to claim 13
wherein the ear rest extends perpendicular to the plane of the front wall.

15. The cellular telephone case according to claim 14
wherein the ear rest is a projection from the front wall located between the display aperture and the top side wall;
wherein the ear rest extends perpendicular to the plane of the front wall.

16. The cellular telephone case according to claim 15
wherein the ear rest is made of a padded material and is adapted to cushion a side of the user's face.

* * * * *